United States Patent Office 3,582,497
Patented June 1, 1971

3,582,497
COMPOSITIONS DERIVED FROM CONTACTING ALUMINOSILICATES AND ALUMS AND PROCESS FOR PREPARING SAME
Donald Francis Best, Tonawanda, and Anthony Peter Bolton, Amherst, N.Y., assignors to Union Carbide Corporation, New York, N.Y.
No Drawing. Filed Nov. 12, 1968, Ser. No. 775,098
Int. Cl. B01j 11/40
U.S. Cl. 252—455R                    26 Claims

ABSTRACT OF THE DISCLOSURE

Reacting cation-exchangeable aluminosilicates with alums forms novel compositions having cation-exchange capacity permitting optional ion-exchange for control of catalytic activity and for metal-loading. In general the compositions are rendered substantially amorphous by calcination and once calcined, are useful as catalysts in various hydrocarbon modification reactions.

This invention relates to compositions containing synthetic crystalline reaction products which are, after calcination, useful as catalysts and to a method for making said compositions.

Hydrocarbon conversion by catalysis is of considerable industrial significance. Conversion of natural mineral oil into marketable fuels for internal combustion engines, for example, requires first the cracking of high molecular weight hydrocrabons to form products containing five to eleven carbon atoms and boiling below 200° C. Thermal cracking was originally employed for this purpose but is inefficient since much material of very low molecular weight is formed at temperatures conducive to cracking at a significant rate. Thermal cracking was superseded in the mid-1930's by catalytic cracking, using natural acidic clays of the alumina-silica type as the catalyst.

Formation of low molecular-weight hydrocarbons per se was, however, insufficient to produce high quality fuels. Higher caloriffic value and increased resistance to detonation or preignition became increasingly important properties, and since aromatic as well as olefinic and highly branched aliphatic hydrocarbons were found to possess qualities suited to those added requirements, the conversion of crude petroleum into these products by catalytic cracking became highly desirable. Silica-alumina type catalysts, which catalyzed the cracking of high molecular weight hydrocarbons of petroleum feed stocks, fortunately catalyzed the isomerization of the products to more highly branched structures, but were unable to catalyze the cyclodehydrogenation of straight-chain paraffins and hence did not lead to desirable aromatic or olefinic products. The advent of "dual-function" or reforming catalysts in the mid-1940's obviated this catalyst short-coming by combining metals having high hydrogeneration-dehydrogenation activity with a cracking catalyst. This combination, therefore, not only formed lower weight hydrocarbons as well as isomers of the products of cracking but in addition converted acyclic compounds to more useful aromatic compounds. A beneficial side effect was realized as well in that reforming catalysts permitted isomerization to proceed at lower temperatures which resulted in a reduction of catalyst deactivation by impeding the deposition of coke on the catalyst mass.

Although many siliceous materials have been developed which are effective in catalyzing the conversion of hydrocarbons, constant effort is being exerted to find new catalysts which are improved with respect to one or more of the properties of stability, selectivity, regenerativity, activity and the like.

It is therefore the general object of this invention to provide novel hydrocarbon conversion catalyst materials which are prepared by the reaction of a cation-exchangeable aluminosilicate and an alum to form a crystalline intermediate or precursor and the subsequent calcination of this precursor.

It is another object to provide novel hydrocarbon conversion processes utilizing the novel catalysts of this invention.

With respect to the novel catalyst materials, the objects of this invention are accomplished by contacting a cation-exchangeable aluminosilicate with an aqueous solution of an alum, preferably at elevated temperatures and saturated with respect to the alum in proportions such that the weight percent of dissolved alum based on the weight of aluminosilicate is at least 5 wt.-percent and for a period of time to form a crystalline phase exhibiting an X-ray powder diffraction pattern having at least lines corresponding to a $d$-spacings of $3.01\pm0.05$; $5.00\pm0.05$; $1.91\pm0.03$ and $1.75\pm0.03$, and thereafter calcining the reaction product at a temperature within the range of 450° C. to 750° C. for a period of from about 0.25 hours to 16 hours, the duration of the calcination being commensurate with the calcination temperature.

The cation exchangeable aluminosilicates suitably employed in preparing the aforesaid catalysts include both naturally occurring aluminosilicates and synthetically prepared compositions having a molar ratio of $SiO_2$ to $Al_2O_3$ of from about 1.5 to 20. Naturally occurring aluminosilicates include clays such as kaolin, bentonite, attapulgite, dickite, halloysite, levisite, nacrite and allophane; feldspars and zeolites such as analcite, chabazite, erionite, faujasite, gmelinite, heulandite, natrolite, phillipsite and the like. Synthetically prepared aluminosilicates include the permutit zeolites and the clay-derived amorphous materials known commercially under the trade name Zeolex (J. M. Huber Corp., U.S.A.) typified by those compositions described in U.S. Pats. 2,739,073 and 2,849,346, as well as the entire class of synthetic crystalline zeolitic molecular sieves now commonly denominated by letter designations such as zeolite Z, U.S. Pat. 2,972,516; zeolite M, U.S. Pat. 2,995,423; zeolite H, U.S. Pat. 3,010,789; zeolite W, U.S. Pat. 3,012,853; zeolite Y, U.S. Pat. 3,130,007; zeolite T, U.S. Pat. 2,950,952; zeolite R, U.S. Pat. 3,030,181; zeolite S, U.S. Pat. 3,054,657; zeolite L, U.S. Pat. 3,216,789; zeolite X, U.S. Pat. 2,882,244; and zeolite A, U.S. Pat. 2,882,243.

Because of their very high cation-exchange capacity, the three-dimensional crystalline zeolitic molecular sieves as a class are preferred starting materials, and especially preferred are the crystalline zeolites of this class which have an original silica to alumina ratio of greater than about 3.5. This latter subclass of zeolites are found generally to retain some crystallinity even after reaction with alum and the presence of this residual crystalline material in the product mass is beneficial in hydrocarbon conversion processes.

The aqueous alum solution which is reacted with the aluminosilicate in accordance with this invention can suitably be prepared from any of the alumns having the general formula (I)    $NH_4M^{III}(SO_4)_2 \cdot 12H_2O$ wherein $M^{III}$ is $Al^{+3}$, $Cr^{+3}$ or $Fe^{+3}$. Particularly preferred is the alum according to Formula I, supra, in which $M^{III}$ is $Al^{+3}$. The concentration of the alum in the solution is not narrowly critical but best results are obtained if a concentration of at least half of the saturation amount at the particular reaction temperature is employed and preferably a saturated aqueous alum solution is utilized.

In the formation of the reaction mixture, large molar excesses beyond stoichiometric requirements can be employed with respect to either the alum or the aluminosilicate reactants. Optimum reactant ratios will depend to some degree upon the particular aluminosilicate composition since, although we do not wish to be bound by any particular theory, it is believed that one step in the reaction mechanism is the extraction of aluminum from the aluminosilicate framework. Moreover, we have found that the more concentrated the aqueous alum solution employed, the more efficient the reaction, all other factors being constant. Accordingly, in general, from about 7 to about 200 grams of alum per 100 grams of aluminosilicate are suitably employed. The aluminosilicate is advantageously placed in the reaction system in a relatively finely divided form.

The reaction is conveniently and simply accomplished by merely forming the reaction mixture and maintaining same, optionally with agitation, at a temperature of from about 20° C. to 150° C. at least until a new crystalline phase is formed which exhibits an X-ray powder diffraction pattern having at least lines corresponding to $d$-spacings of $3.01\pm0.05$; $5.00\pm0.05$; $1.91\pm0.03$ and $1.75\pm0.03$. Continued reaction will, unless there has been serious depletion of one of the reactants, continue to produce this new crystalline material. Pressure is not a significant factor, but as a matter of convenience digestion at autogenous pressure is desirable. Experiment has indicated the most advantageous process for preparing the novel crystalline intermediate material of this invention to be a series of batchwise reflux alum treatments on the original aluminosilicate starting material. It was found that a multiple batchwise reflux alum treatment method was superior to such methods as continued addition of alum solution to a stirred refluxing aqueous zeolite slurry or total alum addition with a single batchwise reflux treatment or continued addition of small amounts of powdered alum. The addition methods require about 60% more alum than does the multiple batchwise method to form about the same amount of crystalline intermediate material. Moreover, the multiple batchwise reflux method affords greater control of the reaction.

The crystalline intermediate is insoluble in water and crystallizes from the reaction system in intimate association with the residue of the aluminosilicate employed as the starting material. Whereas the precise nature of the association between the newly formed crystalline material and the aluminum-extracted aluminosilicate is not completely known, it has been found that the product composite is not separable by conventional macrochemical technique.

The new crystalline phase formed by the aluminosilicate-alum reaction is, without regard to the particular reactants used, the same crystallographically. The cation values thereof can differ depending on the cation values of the starting aluminosilicate. The residue of the aluminosilicate which is present in the product composite, however, can be amorphous or crystalline depending on the nature of the starting aluminosilicate. When an amorphous aluminosilicate is the initial reactant, the residue it contributes to the final composite product remains amorphous. When the starting aluminosilicate is crystalline such as zeolitic molecular sieves, its residue in the final composite can be either crystalline, amorphous or a mixture of the two. The final character of the residue depends on the acid stability of the aluminosilicate which in general depends upon the original $SiO_2/Al_2O_3$ ratio.

When crystalline zeolites having $SiO_2/Al_2O_3$ ratios below about 3.5 are reacted with alum they degrade to a residue found to be substantially amorphous to X-rays. This transition from a crystalline state to an amorphous state may require more than one batchwise reflux alum treatment. With further alum treatments, formation of a crystalline non-zeolitic phase takes place as is evidenced by the subsequent appearance of X-ray diffraction patterns as described above, which patterns tend to become sharper with successive batchwise alum treatments. In contrast, the process of reacting alum with zeolites having $SiO_2/Al_2O_3$ ratios greater than about 3.5 does not destroy the zeolite crystallinity owing to greater acid stability of the higher $SiO_2/Al_2O_3$ ratio zeolites.

Calcination of the crystalline phase composites to yield novel hydrocarbon conversion catalysts in accordance with this invention is accomplished at temperatures from about 300 to about 850° C. for about 0.25 hour to about 48 hours yielding generally amorphous compositions. A crystalline aluminosilicate constituent in the composite to be calcined will retain at least part of its crystallinity in the final calcined product if its $SiO_2/Al_2O_3$ ratio is sufficiently high. The new crystalline phase formed by reaction of the alum and aluminosilicate, however, retains none of its X-ray crystallinity upon calcination.

Ion exchange of the aluminosilicate, the reaction product composite and/or the calcined reaction product may be performed within certain constraints.

In one preferred form the aluminosilicate should not contain more than about 25 equivalent percent alkali metal cations because low alkali metal content is advantageous, e.g., if the product is to be used in hydrocarbon conversion catalysis where the presence of alkali metal is detrimental. Once the reaction product composite has been synthesized, the non-zeolitic crystalline constituent thereof, because it lacks ion exchange properties, cannot readily be reduced in alkali metal content by ion exchange. On the other hand, alkali metal cation exchange and metal loading of the aluminosilicate constituent in the reaction product composite is possible but it should be noted here that calcination is preferably performed below 650° C. to minimize agglomeration in these materials, especially when Group VIII metals are employed.

Following calcination, the substantially amorphous compositions of this invention may or may not possess ion-exchange character depending upon the silicate-alumina ratios of the starting aluminosilicate employed. Generally, crystalline aluminosilicates with silica-alumina ratios of greater than about 3.5 yield reaction product compositions which possess post calcination ion-exchange character. Aluminosilicate ratios of less than about 3.5 on the other hand yield post calcination compositions with much less ion-exchange capability. Similarly, metals such as palladium, platinum and nickel may also be ion-exchanged into or impregnated onto the uncalcined precursor compositions and/or the calcined compositions as well (see U.S. Patent No. 3,236,762).

It may be generally stated that within the Periodic Table of the Elements, "Handbook of Chemistry and Physics," Chemical Rubber Publishing Co., Cleveland, Ohio, the metals and oxides, sulfides, nitrides, halides or oxyhalides thereof of Groups I through VIII inclusive and the Lanthanum and Actinium Series are particularly suitable for contacting with compositions of this invention as hereinabove described.

Co-catalysts may be employed with the calcined precursor for desired purposes, e.g. to enhance activity and/or the selectivity for a particular process, to facilitate catalyst regeneration as in oxidative removal of reaction residues, to extend activity by inhibiting build-up of reaction residues or to contribute specific catalytic activity not already present in the calcined precursor. Co-catalysts include, but are not limited to, catalytically active metals or compounds of metals of Groups I–B, II–B, III–B, IV–B, V–B, VI–B, VII–B, VIII and the Lanthanide and Actinide series of the rare earths as listed in the Periodic Table as found on page B–3 of the Handbook of Chemistry and Physics, 46th Edition, published by the Chemical Rubber Company. Catalytically active compounds include oxides, nitrides, sulfides, halides, and oxyhalides of the catalytic metals.

The co-catalysts are added to or incorporated into the calcined or uncalcined precursor prior to, during or after the agglomeration thereof, if agglomeration is done. One preferred method for incorporating the co-catalyst is by cation exchange employing aqueous solution of one or more of the metals of Groups I–B, II–B, IV–B, VI–B and VIII having soluble cations containing the metal. This is preferably done after the formation of the new crystalline phase and may be done after the thermal decomposition of the new phase when the starting aluminosilicate has a $SiO_2/Al_2O_3$ ratio greater than about 3.5. The metal of the metal containing cation is converted to its elemental state by heating above 200° C. preferably in a reducing atmosphere such as hydrogen. Sulfiding by treatment with hydrogen sulfide is sometimes desirable. Alternatively, or additionally, the co-catalysts may be added by impregnation techniques after the formation of the new crystalline phase. Impregnation is preferably done with the powder or agglomerated catalyst in at least a partially dried state.

The catalysts of this invention may be used in powdered, granular or molded state formed into spheres or pellets of finely divided particles having a particle size of 2 to 500 mesh. In cases where the catalyst is molded, such as by extrusion, the calcined or uncalcined precursor may be extruded before drying, or dried or partially dried and then extruded. The catalyst product is then preferably precalcined in an inert atmosphere near the temperature contemplated for conversion but may be calcined initially during use in the conversion process. Generally, the precursor is dried between 75° C. and 300° C. and thereafter calcined in air, steam or an inert atmosphere of nitrogen, hydrogen, helium, flue gas or other inert gas at temperatures ranging from about 300° C. to 850° C. for periods of time ranging from .25 to 48 hours or more.

The calcined or uncalcined precursor prepared in the foregoing manner, is combined, dispersed or otherwise intimately admixed with a porous inert or co-catalyst binder in such proportions that the resulting product contains from about 1 to 95% by weight, and preferably from about 2 to 80% by weight, of the final composite. The incorporation of the calcined or uncalcined precursor into the binder can be accomplished either before, after, or during cation exchange or impregnation modification thereof. Binders which can be employed include clays, refractory oxides and inorganic gels.

The inorganic oxide may be silica, alumina or a plural gel comprising a predominant amount of silica or alumina with one or more metals or oxides selected from Groups I–B, II, III, IV, V, VI, VII and VIII of the Periodic Table. Particular preference is given to plural gels of silica with metal oxides of Groups II–A, III and IV–A of the Periodic Table, especially wherein the metal oxide is magnesia, rare earth oxide, alumina, zirconia, titania, beryllia, thoria, or combinations thereof. The preparation of silica, alumina and plural gel is well known and generally involves either separate precipitation or coprecipitation techniques in which a suitable salt of the metal oxide is added to an alkali metal silicate and an acid or base, as required, is added to precipitate the corresponding oxide.

The calcined or uncalcined precursor-inorganic oxide gel compositions can be prepared by several methods wherein the calcined or uncalcined precursor is intimately admixed with an inorganic oxide gel while the latter is in a hydrous state as in the form of a hydrosol, hydrogel, wet gelatinous precipitate or a mixture thereof. The mixing of the two components can be accomplished in any desired manner such as in a ball mill or other types of kneading mills.

The binder may also consist of a semi-plastic or plastic clay mineral. The calcined or uncalcined precursor can be incorporated within the clay by blending the two and fashioning the mixture into desired shapes. Suitable clays include attapulgite, kaolin, sepiolite, polygarskite, kaolinite, plastic ball clays, bentonite, montmorillonite, illite, chlorite, etc.

Minor amounts of promoters or other materials which may be present in the composition include cerium, chromium, cobalt, tungsten, uranium, platinum, lead, zinc, calcium, magnesium, barium, lithium, nickel, and their compounds in amounts ranging from 5 to 40 percent by weight based on the finished catalyst.

The catalysts prepared in accordance with the invention find extensive utility in a wide variety of hydrocarbon conversion processes including isomerization of paraffins, olefins and aromatic compounds, dealkylation, alkylation of isoparaffins and aromatics, disproportionation, hydration of olefins, amination of olefins, hydrocarbon oxidation, dehydrogenation, dehydration of alcohols, desulfurization, hydrogenation, hydroforming, reforming, hydrocracking, oxidation, polymerization, cracking, denitrification, and the like.

The process of this invention may be carried out in any equipment suitable for catalytic operations. The process may be operated batchwise. It is preferable, however, and generally more feasible to operate continuously. Accordingly, the process is adapted to operations using a fixed bed of catalyst. Also, the process can be operated using a moving bed of catalyst wherein the hydrocarbon flow may be concurrent or countercurrent to the catalyst flow. A fluid type of operation wherein the catalyst is carried in suspension in the hydrocarbon charge is well adapted for use with the present catalyst.

In addition to a catalyst, the present invention provides a process for the catalytic conversion of hydrocarbons.

The hydrocracking process of this invention comprises passing the petroleum feed stock in admixture with hydrogen over the catalyst at a suitable temperature, feed rate, and pressure to effect a substantial conversion of the feed stock to lower boiling materials such as gasoline.

The hydrocracking conditions employed herein generally involve passing the hydrocarbon feed with hydrogen over the catalyst at temperatures ranging from 150 to 485° F., pressures from 200 to 5,000 p.s.i.g. and preferably from 500 to 3,500 p.s.i.g., and space velocities ranging from 0.5 to 5.0 volumes of feed per hour per volume of catalyst. The preferred hydrogen:hydrocarbon mole ratios can range from 10 to 50.

Feed stocks include straight-run gas oils boiling between about 205 and 425° C., cycle oils from conventional cracking operations boiling generally in the gas oil range, heavy, petroleum fractions boiling from 480 to 760° C., heavy naphtha fractions and alkylaromatic hydrocarbons in general. The process is especially valuable for converting light and heavy gas oils to naphtha boiling in the gasoline range, and to premium quality fuel oils.

The dehydrogenation of hydrocarbons such as propane, butylene, butane, pentane, cyclopentane, cyclohexane, methyl cyclohexane, ethyl benzene and the like, can be carried out at temperatures ranging from about 425 to 760° C., under subatmospheric, atmospheric or superatmospheric pressures with a space velocity (LHSV) from 0.2 to 50. For dehydrogenation, metals and oxides and sulfides of metals from Groups I–B, II–B, VI and VIII of the Periodic Table can be employed as co-catalyst with the calcined precursor.

Reforming, in accordance with the present invention, is generally carried out at a temperature between 370 and 540° C. and preferably between about 425 and 525° C. The pressure during reforming is within the range of about 100 to about 1,000 p.s.i.g., and preferably between about 200 and about 700 p.s.i.g. The liquid hourly space velocity employed, i.e. the liquid volume of hydrocarbon per hour per volume of catalyst is between about 0.1 and about 10 and preferably between about 0.5 and about 4. In general, the molar ratio of hydrogen to hydrocarbon charge employed is between about 1 and about 20 and preferably between about 4 and about 12.

Hydrocarbon charge stocks undergoing reforming in accordance with this invention comprise mixtures of hydrocarbons and, particularly, reformer hydrocarbon charge stocks such as petroleum distillates boiling within the approximate range of 65 to 260° C. which range includes naphthas, gasolines and kerosene. It is, however, preferred to use a selected fraction, such as naphtha having an initial boiling point of between about 65° C. and about 120° C. and an end boiling point of between about 190° C. and about 260° C.

The catalysts of the invention can be employed for hydrogenation of unsaturated aliphatic hydrocarbons, such as mono-olefins, diolefins, etc., to form the corresponding saturated hydrocarbons, hydrogenation of unsaturated cyclic hydrocarbons, and hydrogenation of unsaturated alcohols, ketones, acids, etc. For hydrogenation reactions, the temperature may range up to 540° C. under a pressure of about 10 to 3,000 pounds, p.s.i. or more, at a space velocity (LHSV) from about 0.5 to 5.0. The co-catalysts which are normally employed with the calcined precursors include the metals, oxides and sulfides of metals of Groups I–B, II–B, VI and VIII of the Periodic Table.

The catalysts of the invention may be utilized for the alkylation of aromatic hydrocarbons or phenols with olefinic unsaturated hydrocarbons, alkyl halides and alkyl sulfates. Alkylation of aromatics and phenols may be carried out at temperatures between 0 and 450° C. under pressure of 0 to 1,000 p.s.i.g.

The catalysts of the present invention are extremely active and may be used for the isomerization of a wide variety of feed stocks. Thus, low boiling paraffin hydrocarbons which contain at least four carbon atoms, especially 4 to 10 carbon atoms or olefins of the same carbon number range, such as, for example, normal butene, normal pentene, 2-methyl-1-pentene, 2-methol-2-pentene, may be used.

The conditions under which hydrocarbons are isomerized in accordance with the invention include a temperature ranging from 0° C. to about 450° C., and preferably between about 120° C. and 400° C. The liquid hourly space velocity (LHSV) is between about 0.05 and 40 and preferably between about 0.25 and 10. The molar ratio of hydrogen to hydrocarbon is between about 0.1 and 20 and is preferably between 0.5 and 5. The reaction may be effected under liquid or vapor phase conditions at subatmospheric, atmospheric or superatmospheric pressure. The pressure will be between about 5 to 7,500 p.s.i.a. and is preferably between about 100 and 700 p.s.i.a.

The calcined precursor is a catalyst for the isomerization of polyalkyl substituted aromatic compounds such as xylene, di-ethyl benzene, di-isopropyl benzene, dimethyl naphthalene and the like. Feed to the process of the invention as an example, can be a substantially pure xylene isomer, a mixture of xylene isomers or hydrocarbon fractions rich in xylene isomers. The process of the invention is carried out at a temperature in the range from about 205 to 510° C. and preferably from about 280 to 430° C.

The isomerization reaction can be conducted at a space velocity (WHSV) in the range from about 0.5 to 25, preferably in the range from about 1 to 10.

The presence of hydrogen functions to improve catalyst life, and apparently also, functions to improve conversion and selectivity for the isomerization reaction. A hydrogen to hydrocarbon mole ratio of from about 1:1 to 25:1 and preferably from about 5:1 to 15:1 is used. Total pressure is in the range from about 100 to 1,500 p.s.i.g., and preferably from about 500 to 1,000 p.s.i.g.

The calcined precursor catalyzes the disproportionation of alkylaromatics such as toluene.

Feed for the process of the invention can be a substantially pure alkylaromatic having from 7 to 15 carbon atoms, mixtures of such alkylaromatic hydrocarbons or hydrocarbon fractions rich in the alkylaromatics and includes mono- and diaromatics such as alkylbenzenes and alkylnaphthalenes. The alkylaromatic is converted to higher alkylaromatics and to lower alkylaromatics, including benzene or naphthalene.

The process of the invention is conducted at a temperature in the range from about 200 to 600° C. and preferably from about 300 to 450° C. In general, disproportionation is increased as temperature is increased.

A hydrogen-to-oil mole ratio from about 1:1 to about 50:1 is used. Total pressure is in the range from about 100 to 2,000 p.s.i.g. The disproportionation reaction is effected at a space velocity (WHSV) in the range from about 0.1 to about 25.

The calcined precursor of this invention is useful for the production of polymer gasoline, petrochemical intermediates and high molecular weight oils and resins. These products are obtained from feed stocks rich in $C_2$ to $C_8$ olefins which are contacted with the catalyst at temperatures ranging from 0 to 300° C. at pressures of 1 to 1,000 atmospheres, preferably 1 to 200 atmospheres. Non-distillable high boiling oil and resinous products are removable from the catalyst by solvent extraction but may, if desired, retain the catalyst.

Catalytic cracking utilizing the calcined precursor of this invention alone or in combination with conventional cracking catalyst material, for example, silica-alumina, is conducted in a fluid-bed, on a fixed-bed with moving catalyst particle withdrawal for catalyst regeneration. The hydrocarbon feed is of the gas oil type boiling in the range of 205 to 540° C. The feed is preheated and contacted with the catalyst at temperatures ranging from 370 to 650° C. at a feed rate of 0.5 to 10 liquid volumes per volume of catalyst per hour. The conversion to gasoline fraction and lighter hydrocarbons is about 30 to 70 percent.

Dealkylation and hydrodealkylation wherein a hydrogenation co-catalyst may be employed with the calcined precursors of this invention are processes similar respectively to cracking and hydrocracking of more specific feed materials than used in the latter processes. The process is directed primarily to the removal of $C_2$–$C_4$ alkyl groups pendant to aromatic moleculars, for example, the removal of methyl or ethyl group from toluene, ethyl benzene or methyl or ethyl substituted naphthalenes. Temperatures useful for dealkylation range from 400 to 700° C., at 3 to 100 atmospheres pressure. Hydrogen is added at a mole ratio of 3 to 100 to the feed.

Isoparaffin alkylation for the production of high octane gasoline is conducted with the calcined precursors of this invention using feeds rich in $C_4$ to $C_6$ isoparaffins singly or mixed. The alkylating olefin is a $C_2$ to $C_6$ unsaturated hydrocarbon and may be one or a mixture thereof having straight or branched chain structure. Process conditions include liquid, liquid-vapor or vapor phase operation in the temperature range of 20 to 30° C. The pressure is suitably maintained for the liquid and/or for vapor phase operation as desired with preference for pressures conducive to the presence of at least partial liquefaction of one on the restraint or alkylate products within the catalyst contact zone. The mole ratio of feed olefin to isoparaffin is at most 1:4. A catalyst contacting rate for the olefin is 0.01 to 2 weight hourly basis.

For desulfurization of hydrocarbons, which involves largely hydrogenation, the metals, oxides and sulfides of such metals as cobalt, molybdenum, chromium, manganese, vanadium, tungsten, copper, metals of Group VIII of the Periodic Table and mixtures thereof may be used as co-catalysts with the calcined precursor.

Desulfurization of gas oils boiling from 205 to 540° C. cycle oils, boiling in the gas oil range, light and heavy naphtha fractions, highly aromatic fractions and the like, may be carired out at temperatures between about 315 and 540° C. under atmospheric or superatmospheric pressures with a space velocity (LHSV) between 0.2 and 50. Hydrogen to hydrocarbon ratios range from 100 to 30,000 cubic feet per 42 U.S. gallon barrel. The specific conditions within these ranges will vary with the feed stock undergoing desulfurization and the product specification desired.

The following examples are representative of the process of invention herein described for preparing compositions of this invention and of the effects of certain of these compositions as catalysts in hydrocarbon conversion reactants.

EXAMPLE I

In an example of this invention demonstrating the synthesis of the novel crystalline phase-aluminosilicate residue composites, 89.4 grams (anhydrous basis) of about 88% equivalent ammonium-exchange type Y zeolite having a silica/alumino molar ratio of 3.9 was contacted with an aqueous solution of $NH_4Al(SO_4)_2 \cdot 12H_2O$ (150 gm./liter $H_2O$) in the five separate hot batchwise reflux treatments. For each reaction a 760 milliliter portion of alum solution was used. The mixture of zeolite and alum solution was refluxed for 120 minutes at a temperature of approximately 100° C., filtered and returned to the reaction vessel for contact with a fresh portion of alum solution. After each treatment a sample of the solids was taken for chemical analysis and X-ray examination. Results of the analyses are shown in Table I.

TABLE I

| | Exchange Number | | | | |
|---|---|---|---|---|---|
| | 1 | 2 | 3 | 4 | 5 |
| $Na_2O$ (wt.-percent) | 1.02 | 0.87 | 0.65 | 0.53 | 0.51 |
| $SiO_2$ (wt.-percent) | 61.2 | 52.3 | 42.8 | 36.5 | 31.1 |
| $Al_2O_3$ (wt.-percent) | 31.2 | 31.2 | 30.5 | 29.9 | 29.1 |
| $(NH_4)_2O$ (wt.-percent) | 4.64 | 2.8 | 2.92 | 3.33 | 3.8 |
| $SO_4$ (wt.-percent) | 1.2 | 11.1 | 21.7 | 27.6 | 34.3 |
| Molar ratio $SiO_2/Al_2O_3$ | 3.40 | 2.85 | 2.39 | 2.16 | 1.82 |
| Non-zeolitic crystalline phase (wt. percent) | 7.0 | 16.5 | 37.5 | 44.0 | 63.0 |

The X-ray diffraction pattern of the new crystalline phase formed contained the characteristic $d$-spacings 3.01±0.05; 5.00±0.05; 1.91±0.03 and 1.75±0.03. The product resulting from the fifth alum treatment was calcined in air for 150 minutes at 550° C. The X-ray examination showed relatively small retention of the zeolite Y structure.

EXAMPLE II

In an example of this invention which compares batchwise reflux with the addition method, a 89.4 gram quantity of ammonium-exchanged zeolite Y having oxide-mole-ratios of 3.95 $SiO_2/Al_2O_3$, 0.07 $Na_2O/Al_2O_3$, and 0.88 $(NH_4)_2O/Al_2O_3$ was contacted on a per-batch basis with 760 milliliters of a saturated ammonium aluminum sulfate ($NH_4$ alum) solution (equivalent to 114 grams of alum per batch) for 120 minutes at 100° C. Five batchwise treatments were used, yielding results shown in Table II(A).

The same quantity of ammonium-exchanged zeolite Y as was used in the first part of this example was contacted with ammonium aluminum sulfate in five separate 116-gram additions using a total of 580 grams of alum and using 1.5 liters of demineralized water per batch. After each addition the resulting slurry was heated to reflux at 100° C. and maintained thereat for one hour. Samples were taken after each reaction period, washed, dried and sent for chemical and X-ray diffraction analysis, the results of which are listed in Table II(B). Comparison of Tables II(A) and II(B) reveals batchwise reflux to be superior.

TABLE II

| | Number of $NH_4$-alum treatments | | | | |
|---|---|---|---|---|---|
| | 1st | 2d | 3d | 4th | 5th |
| A) Batchwise reflux method: | | | | | |
| Cumulative grams $NH_4$-alum in saturated solution | 114 | 228 | 342 | 456 | 570 |
| Non-zeolitic crystalline phase (wt.-percent) | 7 | 16.5 | 37.5 | 44.0 | 63.0 |

| | Number of $NH_4$-alum additions | | | | |
|---|---|---|---|---|---|
| | 1st | 2d | 3d | 4th | 5th |
| (B) Addition method: | | | | | |
| Cumulative grams $NH_4$-alum added to reflux slurry | 116 | 232 | 348 | 464 | 580 |
| Non-zeolitic crystalline phase (wt.-percent) | 7 | 7 | 8 | 8 | 32 |

EXAMPLE III

In an example of this invention relating to polyvalent cation-exchange prior to calcination of the intermediate crystalline phase, 134.5 grams (100 grams anhydrous basis) ammonium aluminum sulfate-treated zeolite (which had been 81.7% ammonium ion-exchanged before the alum treatment), having a silica/alumina molar ratio of 3.9, was contacted with calcium chloride solution (200 grams of $CaCl_2$ in 1600 ml. distilled water) in four batchwise treatments at about 100° C. for two hours each resulting in 0.6 wt.-percent calcium-exchanged crystalline intermediate phase. The batchwise reflux exchanges with didymium chloride solution were conducted on another portion of the above precursor at 100° C. for two hours. Didymium ($Di^{+3}$) chloride is a commercial mixture of rare earth metal chlorides having the following typical proportions of metals expressed in terms of weight-percentages of their oxides:

| | |
|---|---|
| $Pr_2O_3$ | 8–12 |
| $La_2O_3$ | 40–45 |
| $Nd_2O_3$ | 32–37 |
| $Sm_2O_3$ | 3–6 |
| $Gd_2O_3$ | 2–4 |
| $Ce_2O_3$ | 1–2 |
| $Yb_2O_3$ | 0.2–1.0 |

Platinum and palladium loading by ion-exchange with, e.g., $Pt(NH_3)_4^{+2}$ ion were conducted separately in one batchwise treatment for two hours at ambient temperatures. The platinum treatment used the above 0.6 wt.-percent calcium-exchanged crystalline intermediate phase as a starting material and one of the two palladium treatments used a 1.23 wt.-percent didymium-exchanged form of the same precursor as a starting material. All other cation-exchanges used the above intermediate phase as a starting material. As can be seen in Table III considerable cation-exchange was achieved.

TABLE III

| Cation: | Wt.-percent [1] |
|---|---|
| $Ca^{+2}$ | 0.6 |
| $Di^{+3}$ | 1.2 |
| $Pd^{+2}$ (ammine) | 0.24 |
| $Pt^{+2}$ (ammine) ion-exchange of $Ca^{+2}$ ion-exchanged crystalline intermediate phase | 0.41 |
| $Pd^{+2}$ (ammine) ion-exchange of $Di^{+3}$ ion-exchanged crystalline intermediate phase | 0.33 |

[1] Anhydrous basis (of cation accepted into the crystalline intermediate phase).

EXAMPLE IV

In an example of this invention which demonstrates the alkylation properties of a typical catalyst of this invention, the catalyst was prepared by reacting $$NH_4Al(SO_4)_2 \cdot 12H_2O$$

and an 89.4% ammonium-exchanged zeolite Y having a silica/alumina molar ratio of 3.9. The reaction product contained 47 wt.-percent of the newly formed non-zeolitic crystalline phase. After calcination at 550° C. for 1.5 hours in air the product was found to be amorphous by X-ray diffraction and oxygen adsorption tests. The calcined catalyst material produced a 60% benzene conversion after one hour using the standard batch-type benzene propylene alkylation test. In this test liquid benzene and the appropriate quantity of anhydrous catalyst powder (usually about 10 grams per mole of benzene for rapid reaction rates) are charged to a reaction vessel fitted with a stirrer and reflux condenser. Propylene is introduced through a gas inlet tube below the surface of the slurry at a rate such that complete conversion is obtained. The progress of the reaction is followed by analyses of aliquot samples from the reaction mixture. Upon completion of the reaction, the catalyst is recovered by simple filtration.

A description of the metal-loading and polyvalent cation-exchange techniques, as used herein for the catalyst precursor compositions of the invention, will be found in U.S. Pat. 3,236,762.

After calcination at 550° C. in air for 2.5 hours, the product was found to produce 73% benzene conversion after one hour in the standard batchwise benzene-propylene test.

EXAMPLE V

In another example of this invention paraffin isomerization was achieved using a catalyst material derived from a precursor prepared from zeolite Y having a silica/alumina molar ratio of five, such precursor containing 20 wt.-percent non-zeolitic crystalline material and 0.5 wt.-percent palladium. The paraffin feed was n-pentane. The catalyst was calcined at 550° C. in air for 2.5 hours and reduced in $H_2$ at 375° C. for one hour. Equilibrium distribution of isomers was achieved at 400° C.

EXAMPLE VI

In another example of this invention, hydrocarbon reforming was accomplished using a catalyst material derived from a precursor based on ammonium aluminum sulfate treated 81.7% ammonium-exchanged type Y zeolite having a silica/alumina molar ratio of 3.9. The non-zeolitic crystalline material comprised 66 wt.-percent of the precursor, which was then calcium-exchanged to achieve 0.6 wt.-percent CaO, metal-loaded with 0.41 wt.-percent platinum by ion-exchange and then thermally decomposed in air at 550° C. for 2.5 hours. Activity of this catalyst was stable and very high. The hydrocarbon feed used in this run was naphtha.

EXAMPLE VII

In another example of this invention, hydrocracking was achieved using a catalyst material derived from a precursor based on alum-treated ammonium-exchanged type Y zeolite which had been 89.7% ammonium-exchanged and which had an initial silica/alumina molar ratio of five. The precursor material after synthesis was found to contain 19% non-zeolitic crystalline material. This precursor material was loaded with palladium to the extent of 0.5 wt.-percent by cation-exchange. Said cation-exchanged product was calcined in air for 2.5 hours at 550° C., activated in $H_2$ at 400° C. for about 2 hours and then placed on stream for 100 hours. At the end of that time, the temperature required to produce a 55% conversion with the catalyst of the invention, was 512° F. The hydrocarbon feed used in this run was a heavy gas oil. It should be noted that the palladium exchange was achieved through ammine complex cation exchange which is fully described in U.S. Pat. 3,236,903.

EXAMPLE VIII

In another example of this invention, a precursor material containing non-zeolitic crystalline material was prepared by treating 90% ammonium-exchanged type Y zeolite having a silica/alumina molar ratio of 3.9 with a 14 gm./100 ml. solution of chrome ($CR^{+3}$) alum in five batchwise reflux treatments, wherein each treatment was conducted at 100° C. for two hours. About 13 wt.-percent non-zeolitic crystalline material was formed in the precursor material after the above chrome alum treatments.

EXAMPLE IX

In another example of this invention, a precursor material containing non-zeolitic crystalline material was synthesized using amorphous hydrate1 sodium alumino-silicate, namely "Zeolex 23"; see U.S. Pats. 2,739,073 and 2,849,346. The method of synthesis is similar to that used in crystallizing intermediate phases from crystalline zeolite starting materials. Specifically, the "Zeolex 23" material was given five batchwise refluxes with saturated ammonium sulfate solution at 100° C. wherein each reflux lasted for two hours.

EXAMPLE X

In another example of this invention, separate preparations of 96.3 percent La-exchanged and 65.5 percent $NH_4$-exchanged zeolite X having $SiO/Al_2O_3$ ratios of 2.5 were separately treated by refluxing with a saturated aqueous ammonium aluminum sulfate solution at 100° C. for one hour per batchwise treatement. X-ray diffraction tests on sample taken after the third batchwise alum treatment established the presence of lines characteristic of the non-zeolitic crystalline phase which increased in intensity with subsequent ammonium aluminum sulfate treatments.

In a test of base-exchange character, portions of each crystalline intermediate phase were contacted with equivalent amounts of concentrated tetraamine palladium (II) chloride and chloroplatinic acid solutions and thereafter washed with demineralized water. Chemical analyses of the treated products showed a greater than 15 fold introduction of Pd from the complex cation salt over Pt from the anionic Pt solution.

What is claimed is:

1. A process which comprises contacting a cation-exchangeable aluminosilicate having a $SiO_2$ to $Al_2O_3$ mole ratio range of from about 1.5 to about 20 with an aqueous solution of at least one alum of the general formula $NH_4M^{III}(SO_4)_2$ wherein $M^{III}$ is a metal selected from the class consisting of Al, Cr, or Fe for a time sufficient to produce a solid reaction product containing a new crystalline phase exhibiting an X-ray powder diffraction pattern having at least lines corresponding to $d$-spacings of $3.01\pm0.05$; $5.00\pm0.05$; $1.91\pm0.03$ and $1.75\pm0.03$.

2. A process as described in claim 1 wherein the cation-exchangeable aluminosilicate is a zeolitic molecular sieve having a $SiO_2$ to $Al_2O_3$ mole ratio range of from about 1.5 to about 20.

3. A process as described in claim 2 wherein the zeolitic molecular sieve is a type Y zeolite.

4. A process as described in claim 1 wherein the alumino-silicate is a cation-exchangeable amorphous alumino-silicate.

5. A process as described in claim 1 in which the cation-exchangeable aluminosilicate contains less than about 25 equivalent percent alkali metal cation.

6. A process as described in claim 1 wherein the preferred concentration is a saturated aqueous alum solution and a preferred contacting temperature is about 100° C.

7. A process as described in claim 1 which includes the additional step of contacting the solid reaction product with at least one material selected from a group consisting of the metals and oxides, sulfides, nitrides, halides or oxyhalides thereof of Groups I through VIII inclusive, and the lanthanum or actinium series of the Periodic Table of the Elements.

8. A process as described in claim 7 wherein the contacting material comprises from 0.05 to 30 wt.-percent of the resulting solid product.

9. A process as described in claim 7 which includes the additional step of compositing the contacted solid reaction product with at least one binder selected from a group consisting of silica gel, alumina gel, silica-alumina gel or clays and thereafter forming the composite into particles.

10. A process as described in claim 7 wherein the contacting material is at least one metal selected from a group consisting of Groups II–A, II–B or the rare earths of the Periodic Table of the Elements.

11. A process as described in claim 1 which includes the additional step of subjecting the products thereof to a temperature ranging from about 450° C. to about 850° C. for a period ranging from about 0.25 to about 48 hours.

12. A process as described in claim 7 which includes the additional step of subjecting the products thereof to a temperature ranging from about 450° C. to about 850° C. for a period ranging from about 0.25 to about 48 hours.

13. A process as described in claim 8 which includes the additional step of subjecting the products thereof to a temperature ranging from about 450° C. to about 850° C. for a period ranging from about 0.25 to about 48 hours.

14. A process as described in claim 9 which includes the additional step of subjecting the products thereof to a temperature ranging from about 450° C. to about 850° C. for a period ranging from about 0.25 to about 48 hours.

15. A catalyst useful in hydrocarbon conversion comprising the product of the process of claim 1.

16. A catalyst useful in hydrocarbon conversion comprising the product of the process of claim 7.

17. A catalyst useful in hydrocarbon conversion comprising the product of the process of claim 8.

18. A catalyst useful in hydrocarbon conversion comprising the product of the process of claim 9.

19. A catalyst useful in hydrocarbon conversion comprising the product of the process of claim 12.

20. A catalyst useful in hydrocarbon conversion comprising the product of the process of claim 13.

21. A catalyst useful in hydrocarbon conversion comprising the product of the process of claim 14.

22. A catalyst useful in hydrocarbon conversion comprising the product of the process of claim 15.

23. An alkylation catalyst prepared according to the process of claim 5 wherein the cation-exchangeable alumino-silicate is type Y zeolite, the alum is $NH_4Al(SO_4)_2$ and the solid reaction product is thereafter contacted with rare earth cations prior to calcination.

24. A paraffin isomerization catalyst prepared according to claim 12 wherein the cation-exchangeable aluminosilicate is type Y zeolite which has been contacted with ammonium ions and the alum is $NH_4Al(SO_4)_2$.

25. A hydrocarbon reforming catalyst prepared according to claim 5 wherein the cation-exchangeable aluminosilicate is type Y zeolite, the alum is $NH_4Al(SO_4)_2$ and wherein the solid reaction product is contacted with calcium ions and thereafter contacted with platinum prior to calcination.

26. A hydrocracking catalyst prepared according to claim 5 wherein the aluminosilicate is type Y zeolite, the alum is $NH_4Al(SO_4)_2$ and the solid reaction product is contacted with palladium prior to calcination.

References Cited

UNITED STATES PATENTS

| | | | |
|---|---|---|---|
| 2,739,073 | 3/1956 | Bertorelli | 106—306X |
| 3,414,525 | 12/1968 | Michalko | 252—455X |
| 3,455,842 | 7/1969 | Cornelius et al. | 252—455 |

DANIEL E. WYMAN, Primary Examiner

C. F. DEES, Assistant Examiner

U.S. Cl. X.R.

252—455Z; 208—111